April 4, 1939. U. CURCI 2,153,239
ELECTRIC HEATER
Filed March 21, 1938
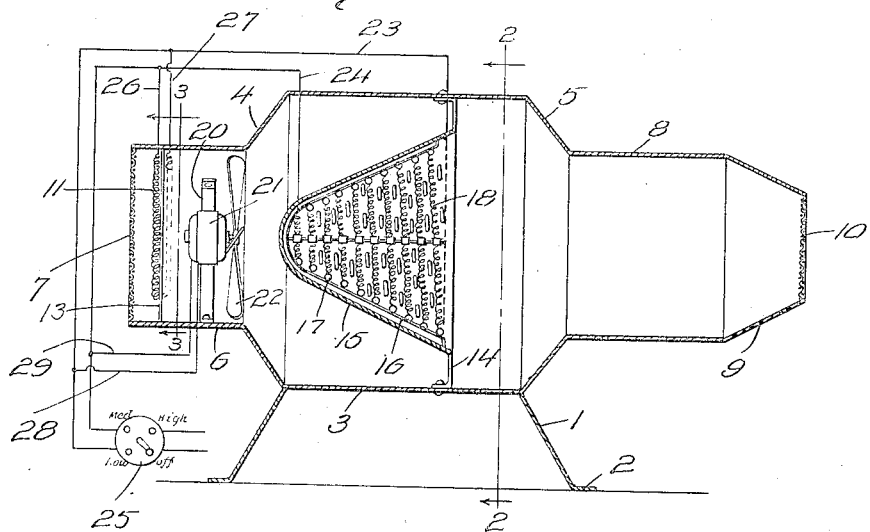
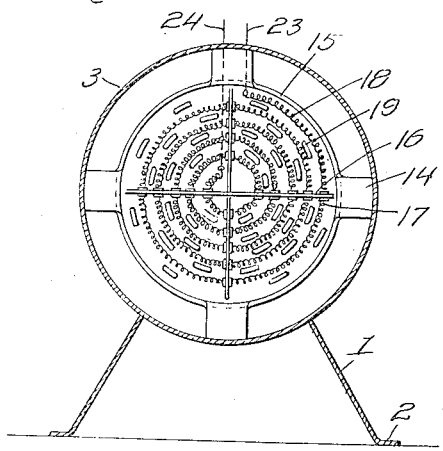
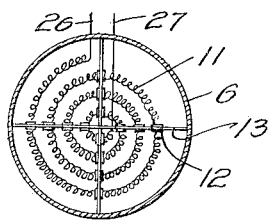
Urbano Curci, INVENTOR
BY Victor J. Evans & Co.
ATTORNEYS Patented Apr. 4, 1939

2,153,239

UNITED STATES PATENT OFFICE 2,153,239

ELECTRIC HEATER

Urbano Curci, Ridgway, Pa.

Application March 21, 1938, Serial No. 197,284

4 Claims. (Cl. 219—39)

This invention relates to electric heaters, and its general object is to provide a heater of the air blast type, in which the air is preheated by being drawn through and about an initial electric heating element and thence the preheated air is blown about a master heating element, therefore it will be seen that the air is heated to a maximum degree before being passed from the heater for distribution.

A further object is to provide an electric heater that includes a casing for housing the heating elements and fan or blower therefor, and which is provided with a screened inlet and a screened outlet, which together with the arrangement of the heating elements and blower provides an ample amount of clean and heated air.

Another object is to provide an electric heater that is capable of heating a maximum amount of air under pressure, with minimum consumption of current, and the heater is simple in construction, inexpensive to manufacture, and extremely efficient in operation, use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a longitudinal vertical sectional view taken through the electric heater which forms the subject matter of the present invention, and illustrates the circuit for the fan and heating elements thereof.

Figure 2 is a sectional view taken approximately on line 2—2 of Figure 1, looking in the direction of the arrows.

Figure 3 is a sectional view taken approximately on line 3—3 of Figure 1, looking in the direction of the arrows.

Referring to the drawing in detail, the reference numeral 1 indicates the base of my heater which may be of the hollow walled type as shown, with a flange 2 formed on the lower edge thereof and extending horizontally therefrom for the purpose of receiving suitable securing means for fixing the heater to suitable supporting means.

Mounted upon the base is the body 3 of the casing of my heater, which is shown as being of substantially cylindrical formation and has restricted end portions 4 and 5. The body 3 is hollow and formed on the restricted end portion 4 is an inlet collar 6 that has its outer end closed by a disk closure 7 of a screen wire, while formed on the restricted end portion 5 is an outlet collar 8 having a restricted mouth 9 that is likewise closed by a disk closure 10 of screen wire.

Mounted in the inlet collar 6 is a heating element 11 which I term the initial heating element and it is shown as being of the coil type, with the coils mounted in and extending through insulating sleeve members 12 that are secured to crossed strips which likewise may be of insulating material and have their ends fixed to the inlet collar, as best shown in Figure 3.

Mounted in the body 3 and supported centrally therein by bracket members 14 is the master heating element of my heater and which includes a conical body 15 having its apex end directed toward the inlet end of the casing, which includes the body 3 and the inlet and outlet collars 6 and 8 respectively. The opposite end of the body 15 is open as shown, and the body 15 is made from some suitable fire resisting material, with ribs 16 formed thereon and extending from its inner surface from adjacent the open end, as best shown in Figure 1. The ribs have insulating sleeve members 17 secured thereto, and mounted in and extending through the members 17 is a heating coil 18. Formed on the inner surface of the conical body 15 throughout the entire area thereof are elongated projections 19 that are arranged in circular rows, with the projections of the rows alternately disposed, as best shown in Figure 2. These projections tend to hold the heat and causes the conical body to be heated in a more uniform manner.

Mounted in the inlet collar 6 centrally thereof and supported by brackets 20 is the motor 21 of the blower of my heater, and which includes fan blades 22 directed toward the apex end of the conical body, as clearly shown in Figure 1.

The initial and master heating elements, as well as the fan are electrically connected in parallel, in that conductors 23 and 24 extend from the heating coil 18 to a switch member 25 and the coil of the heating element 11 has connected thereto conductors 26 and 27 that are in turn connected to the conductors 23 and 24, while the fan or blower is connected to the conductors 23 and 24 by conductors 28 and 29. The switch 25 is of the multiple contact type in the form as shown, so that a varying amount of current can be supplied to the elements and the blower.

From the above description and disclosure of the drawing, it will be obvious that when the switch which is connected to a suitable source of current, is closed, that the circuit to the heating elements and the blower is likewise closed and the blower will draw air through the initial heating element 11 and direct the same against the conical body of the master heating element, consequently the air is preheated before reaching the master heating element where it is again heated to a maximum degree and thence is blown through the outlet for distribution.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. An electric heater comprising a casing, a screened inlet portion and a screened outlet portion for said casing, said outlet portion having a restricted outer end, a blower in the inlet portion, initial heating means in the inlet portion between the outer end thereof and the blower, master heating means in the casing between the blower and the outlet portion, and said master heating means including a conical body having its apex end directed toward the blower.

2. An electric heater comprising a casing, a screened inlet portion and a screened outlet portion for said casing, said outlet portion having a restricted outer end, a blower in the inlet portion, initial heating means in the inlet portion between the outer end thereof and the blower, master heating means in the casing between the blower and the outlet portion, said master heating means including a hollow conical body having its apex end directed toward the blower, ribs formed on the inner surface of the conical body and a heating coil connected to the ribs and having the convolutions thereof following the shape of the body.

3. An electric heater comprising a casing, an inlet and outlet therefor, a blower in the casing, initial heating means between the inlet and blower, master heating means between the blower and the outlet, said master heating means including a conical body having its apex end directed toward the blower, said body being hollow and having an open end directed toward the outlet, bracket means for supporting the conical body centrally within the casing, ribs formed on the inner surface of the body, insulating members secured to the ribs, a heating coil mounted on and extending through the insulating members and having its convolutions following the shape of the body, projections arranged in circular rows on the inner surface of the body between the convolutions of the coil, and the projections being alternately arranged for staggered association with each other.

4. An electric heater comprising a casing including a cylindrical body having restricted end portions, an inlet portion formed on one restricted end portion, an outlet portion formed on the other restricted end portion and terminating in a restricted outer end, a base for supporting the casing and secured to and depending from the body, a blower in the inlet portion, initial heating means in the inlet portion and disposed between the outer end thereof and the blower, said heating means including crossed strips, insulating members on the crossed strips, a heating coil extending through the insulating members, heating means mounted centrally of the cylindrical body and including a conical body having its apex end directed toward the blower, said conical body being hollow and having an open end directed toward the outlet portion, a heating coil within the conical body, an electrical circuit for both the heating means and the blower, and a switch for controlling the circuit.

URBANO CURCI.